United States Patent [19]

Sims, Jr.

[11] Patent Number: 4,514,774
[45] Date of Patent: Apr. 30, 1985

[54] METHOD AND AN APPARATUS FOR EXTRACTING TAPE FROM A TAPE CARTRIDGE OF THE INTERNAL BELT-DRIVE TYPE

[75] Inventor: Dewey M. Sims, Jr., Wayne, Mich.

[73] Assignee: Northern Telecom Limited, Montreal, Canada

[21] Appl. No.: 393,598

[22] Filed: Jun. 30, 1982

[51] Int. Cl.³ .................. G11B 15/66; G11B 5/08; G11B 15/32; G11B 23/04
[52] U.S. Cl. .................................... 360/95; 360/85; 242/199
[58] Field of Search .............. 360/95, 90, 96, 86, 360/85, 93, 96.2, 96.3, 96.4, 60, 130.22, 130.23; 242/192, 195, 198, 199, 200, 180; 226/91, 92

[56] References Cited

U.S. PATENT DOCUMENTS

| | | |
|---|---|---|
| 3,692,255 | 9/1972 | Von Behren . |
| 3,784,761 | 1/1974 | Moritan ................................. 360/95 |
| 3,860,960 | 1/1975 | Akamine . |
| 4,045,820 | 8/1977 | Staar . |
| 4,054,923 | 10/1977 | Lewis ................................. 360/95 |
| 4,092,686 | 5/1978 | Schulz . |
| 4,258,399 | 3/1981 | Iijima et al. . |
| 4,275,424 | 6/1981 | Maxey . |
| 4,387,411 | 6/1983 | Clausen ............................... 360/85 |
| 4,431,146 | 2/1984 | Merle ................................. 242/199 |

OTHER PUBLICATIONS

IBM Technical Disclosure Bulletin, "Automatic Tape Threading", by R. B. Johnson et al., vol. 9, No. 8, Jan. 1967, p. 968.

*Primary Examiner*—R. M. Kilgore
*Attorney, Agent, or Firm*—Schwartz, Jeffery, Schwaab, Mack, Blumenthal & Koch

[57] ABSTRACT

A method and an apparatus for withdrawing tape from an internal elastic-belt-drive type cartridge is disclosed. At least one member is inserted into the cartridge, just behind the tape, where the tape is exposed by the cartridge, to exert a tensile force on the tape, in a direction generally perpendicular to the undisturbed surface of the tape and simultaneously, the reels of the cartridge are driven in their standard manner.

6 Claims, 7 Drawing Figures

METHOD AND AN APPARATUS FOR EXTRACTING TAPE FROM A TAPE CARTRIDGE OF THE INTERNAL BELT-DRIVE TYPE

BACKGROUND OF THE INVENTION

This invention relates generally to the field of loading tape carriers into a machine for recording on or playing back from, the tape, and more particularly to a method and an apparatus for loading tape cartridges of the internal belt-drive type wherein the tape must be pulled from the cartridges and wrapped around a suitable transducer.

One cartridge of the internal elastic belt-drive type is depicted in U.S. Pat. No. 3,692,255 dated Sept. 19, 1972 by R. A. Von Behren. In a cartridge of this type the tape is carried by two reels referred to generally as a "supply" reel and a "take-up" reel. The drive for the reels is provided by an "endless" elastic belt which contacts the tape on both reels with the result that, by driving the belt, both the reels are also driven.

It is known in the art, when recording on and playing back from a tape, to draw a loop of tape from a conventional cartridge (i.e. not of the internal belt-drive type) and to wrap the tape around (less than 360°) a rotating transducer. U.S. Pat. No. 3,860,960 dated Jan. 14, 1975 by T. Akamine depicts one such system. Many other systems for withdrawing tape from cartridges and cassettes (referred to generally as tape carriers) exist in the art. The following U.S. patents depict but a few of those systems, and attention is directed to them: U.S. Pat. No. 4,045,820 dated Aug. 30, 1977 by T. C. J. L. Staar; U.S. Pat. No. 4,092,686 dated May 30, 1978 by G. Schulz; and U.S. Pat. No. 4,258,399 dated Mar. 24, 1981 by K. Iijima et al. *IBM Technical Disclosure Bulletin* Vol. 9, No. 8, January 1967 in an article on page 968 entitled "Automatic Tape Threading" by R. B. Johnson et al discloses yet another scheme for withdrawing tape from a cartridge.

These techniques of withdrawing tape from a cartridge work well with conventional cartridges, but pose problems when employed with cartridges of the internal belt-drive type. The reason for the difficulties with the internal belt-drive type cartridges is that it is difficult to withdraw the tape from that type of cartridge without damaging the tape. With an internal belt-drive type cartridge, when the tape is removed from one reel, the drive belt moves and consequently the other reel is also moved to accept tape; in other words, no appreciable slack can normally appear in the tape; certainly not enough slack to permit a loop of sufficient size to engage a transducer.

One solution to this problem is depicted in U.S. Pat. No. 4,275,424 dated June 23, 1981 by A. R. Maxey. The solution, according to that patent, is to provide a special cassette that holds a length of the tape proud of the reels in ready access of a transducer. When the cassette is not in active use, a lever arm applies tension to the exposed length of tape, thereby partially withdrawing it into the cassette. When in active use, (i.e. in engagement with a transducer) the lever arm releases the tape allowing it to contact the transducer. The facts that the cassette includes a "cut-out" portion and that the tape contacts the transducer significantly less than 180° of tape turn also play a factor in this solution (see column 1, lines 48 and 49 of that patent).

One major drawback to such a solution is the need to use a special cassette.

Is is one object of the present invention to withdraw tape from an internal belt-drive cartridge of standard manufacture (one example being a model DC-300A cartridge manufactured by the Minnesota Mining and Manufacturing Co., commonly referred to as 3M) and to wrap the tape so withdrawn around (less than 360°) a transducer.

SUMMARY OF THE INVENTION

The present invention is directed to a method and an apparatus for withdrawing tape from an internal belt-drive type cartridge of standard manufacture (e.g. a 3M model DC-300A), and wrapping same around a transducer (less than 360°). This is accomplished, according to the present invention, by inserting at least one member into the cartridge, just behind the tape, where the tape is exposed by the cartridge, and pulling on the tape, in a direction generally perpendicular to the undisturbed surface of the tape and simultaneously driving the reels of the cartridge in their standard manner.

In short, it has been found that tape can indeed be withdrawn from an internal elastic-belt-drive cartridge by the method of driving the tape while withdrawing it.

Stated in other terms, the present invention is a method of withdrawing tape from an internal belt-drive tape carrier, the method comprising the steps of: (a) applying a force to the tape in a direction so as to bias the tape towards the exterior of the carrier; and (b) driving the reels of the carrier while performing step (a).

Stated in yet other terms, the present invention is a method of withdrawing tape from an internal elastic-belt-drive tape cartridge, the method comprising the steps of: (a) driving the reels of the cartridge in a normal manner; and (b) applying a tensile force to the tape in a direction so as to cause the tape to exit the cartridge.

Stated in still other terms, the present invention is an apparatus for withdrawing tape from an internal belt-drive tape cartridge, the apparatus comprising: means for withdrawing tape from the cartridge by applying a tensile force to the tape; and means for driving the reels of the tape cartridge while the tensile force is applied to the tape.

BRIEF DESCRIPTION OF THE DRAWINGS

The present invention will now be described in more detail with reference to the accompanying drawings, wherein like parts in each of the several figures are identified by the same reference character, and wherein.

DETAILED DESCRIPTION

Figure 1:
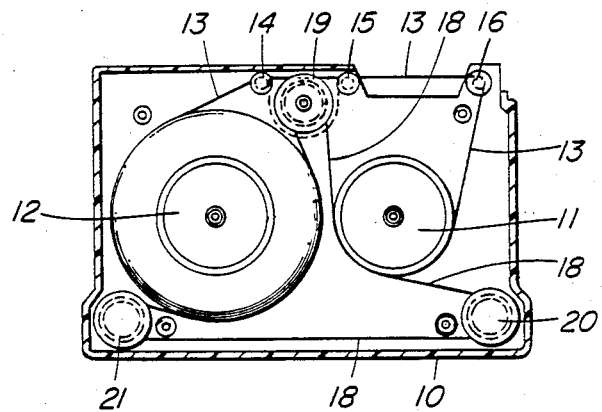
FIG. 1 is a simplified plan view of a cartridge of the internal elastic-belt-drive type suitable for use with the present invention.

FIG. 1 depicts a prior art tape cartridge of the internal elastic-belt-drive type; a type of cartridge with which the present invention is well suited to function. As the cartridge of FIG. 1 is well known in the prior art, it will not be discussed at great length.

Cartridge 10, of FIG. 1, contains two reels indicated as 11 and 12. The bulk of the tape is shown on reel 12. The path of the tape 13 between reels 11 and 12 is depicted. The tape 13 leaves reel 12, passes by rollers 14, 15, and 16 and returns to reel 11.

A flexible, elastic belt 18 is located, as shown in FIG. 1, around a driving roller 19, and rollers 20 and 21. It will be noted that belt 18 also contacts the outer surface of the tape contained on reels 11 and 12. When the driving roller 19 is rotated (by means not shown) the flexible belt 18 is caused to move. This in turn causes the reels 11 and 12 to rotate, thus taking tape from one of the reels and supplying it to the other reel.

Figure 2:
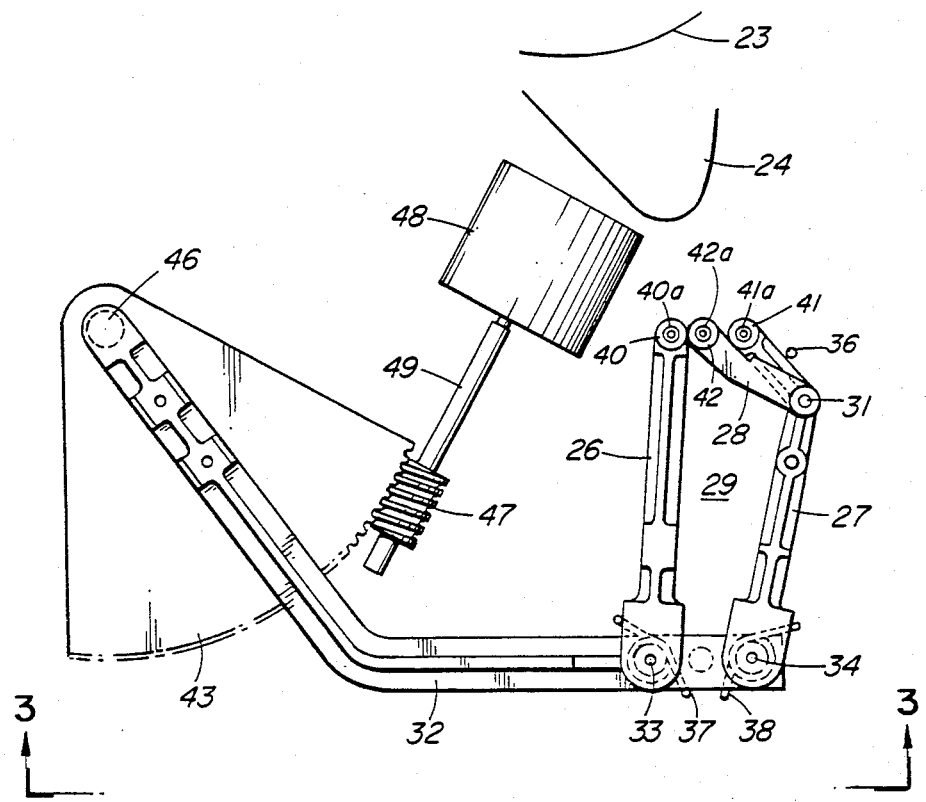
FIG. 2 is a simplified plan view of a mechanism constructed according to the present invention for withdrawing tape from a cartridge.
Figure 3:
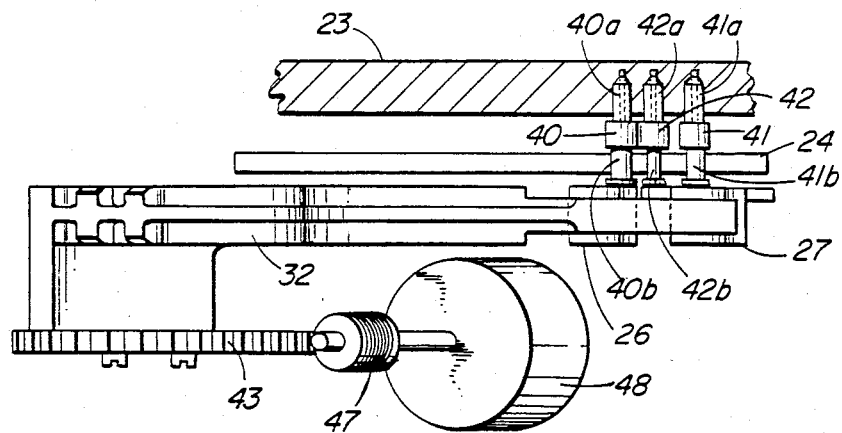
FIG. 3 is a simplified cross-sectional view of the mechanism of FIG. 2.

FIG. 2 depicts a simplified plan view of the preferred mechanism, according to the present invention, for withdrawing tape from a cartridge of the general type depicted in FIG. 1. FIG. 3 is a sectional view of FIG. 2, taken from the view 3—3 as depicted in FIG. 2; FIGS. 2 and 3 should be referred to, together. A rotating drum assembly 23 supporting two magnetic transducers (not shown) is shown mounted above a lever guide member 24. Levers 26, 27, and 28 form a lever system 29 depicted in its rest or unengaged position. Lever 28 is pivotally mounted to lever 27 by a pivot pin 31. Levers 26 and 27 are mounted to boom member 32 by pivot pins 33 and 34 respectively. Spring 36 biases lever 28 towards lever 27, as depicted in FIG. 2. Springs 37 and 38 bias levers 26 and 27, respectively, towards one another. Levers 26, 27 and 28 are depicted in FIG. 2 in their normally biased position, when at rest (i.e. with no tape withdrawn from the cartridge).

Figure 5:
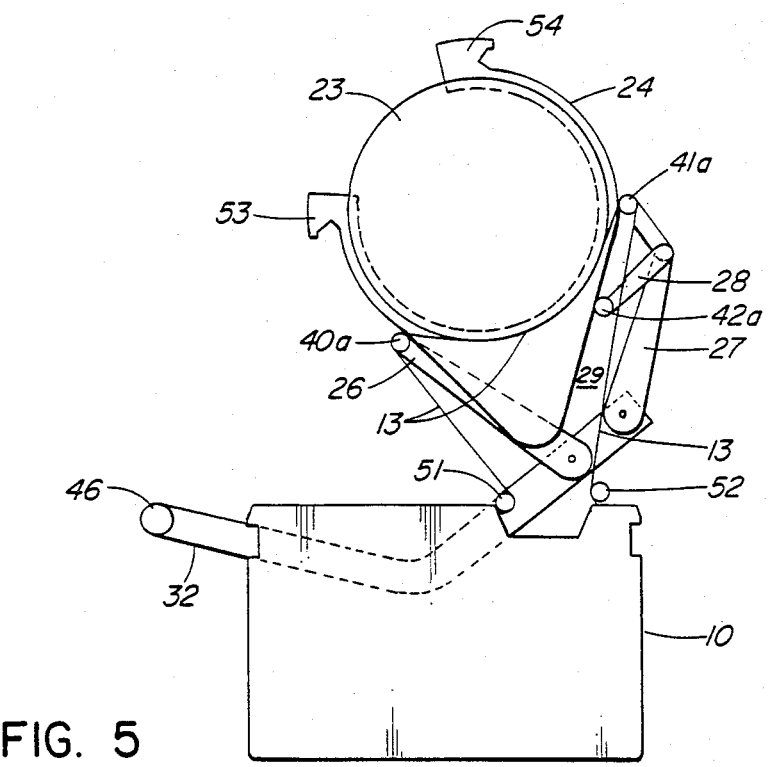
FIG. 5 is similar to FIG. 4, but depicts a loop of tape partially withdrawn from the cartridge.
Figure 6:
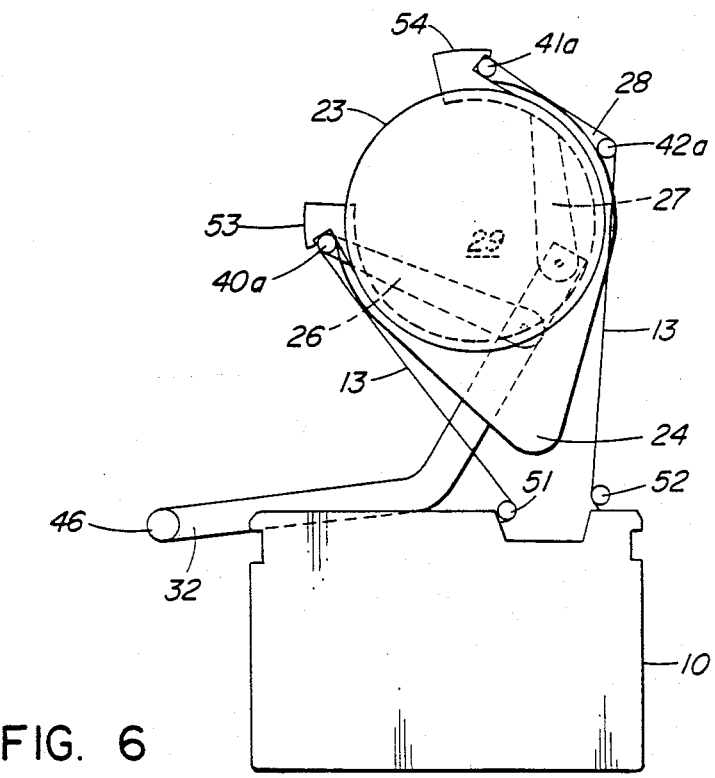
FIG. 6 is similar to FIG. 4, but depicts the loop of tape at the maximum extent of its extraction and wrapped around the rotating drum assembly.

Axle assemblies 40, 41, and 42 are mounted on the free ends of levers 26, 27, and 28 respectively as depicted. Rollers 40a, 41a, and 42a are mounted on axle assemblies 40, 41, and 42 respectively as depicted. The purpose of rollers 40a, 41a and 42a is to engage the tape 13 (FIG. 1) to draw it out of cartridge 10 (FIG. 1). The purpose of axle assemblies 40, 41, and 42 is to support the rollers 40a, 41a, and 42a, respectively, and also to engage lever guide member 24 to thereby become moved from their rest position and move about lever guide member 24 to thereby guide the tape 13 about a portion of drum assembly 23. This will become more apparent later, when FIGS. 4 to 6 are discussed.

It should also be noted that axle assemblies 40, 41, and 42 have recessed portions 40b, 41b, and 42b, respectively that are the areas that actually contact lever guide member 24. The purpose of these recessed portions 40b, 41b, and 42b is to limit any excessive up and down movement at the extremities of levers 26, 27, and 28 that might otherwise exist.

Boom member 32 is securely attached to a worm gear 43. Boom member 32 and worm gear 43 move together about pivot pin 46. Worm 47, driven by motor 48 via coupling 49, engages worm gear 43 and causes worm gear 43, and consequently boom member 32 to pivot about pivot pin 46, in the plane of the Figure. This results in lever system 29 moving towards lever guide member 24, which will be described later in more detail.

Figure 4:
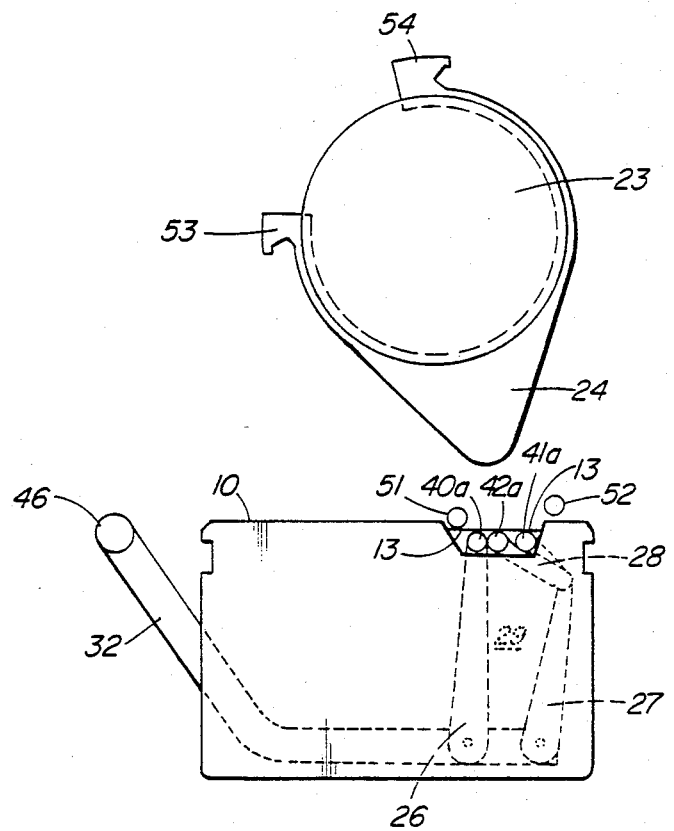
FIG. 4 is a simplified plan view of the mechanism of FIG. 2 in cooperation with the cartridge of FIG. 1, depicted in the retracted position.

FIG. 4 is a simplified plan view of the mechanism of the present invention depicting its interaction with a cartridge 10. Drum assembly 23 and cartridge 10 are in approximately the same plane. Boom member 32 is situated underneath cartridge 10 and lies in a plane approximately parallel to the plane in which the cartridge is situated. Levers 26, 27, and 28 are also located under cartridge 10 and lie in approximately the same plane as does boom member 32. Rollers 40a, 41a, and 42a protrude into a recess provided in cartridge 10, as shown. This enables rollers 40a, 41a, and 42a to be situated behind tape 13. In other words, tape 13 is located between rollers 40a, 41a, and 42a and drum assembly 23. Rollers 51 and 52 are also depicted. They are shown in greater detail in FIG. 7.

FIG. 5 is similar to FIG. 4, but shows the lever system 29 engaging lever guide member 24 and shows some tape 13 withdrawn from cartridge 10. When boom member 32 is pivoted toward lever guide member 24 (as depicted in FIG. 5) levers 26, 27, and 28 are moved towards lever guide member 24 also, withdrawing some tape 13 in the process. When recessed portions 40b, 41b, and 42b (FIG. 3) come into contact with lever guide member 24, they separate as depicted. Roller 40a moves to the left of lever guide member 24 while rollers 41a and 42a move to the right of lever guide member 24. Additionally, rollers 41a and 42a separate as depicted.

As can be seen from FIG. 5, tape 13 is being brought into contact with drum assembly 23. Rollers 51 and 52 act as guide rollers to prevent the tape 13 from scuffing against the sides of cartridge 10. Rollers 51 and 52 are also part of a tension sensing mechanism to be described more fully in reference to FIG. 7.

FIG. 6 is similar to FIG. 5, but shows the lever system 29 at the limit of its travel, with recessed portion 40b against stop 53 and recessed portion 41b against stop 54. As can be seen in FIG. 6, levers 26, 27, and 28 are located underneath lever guide member 24. Tape 13 is wrapped around drum assembly 23 from approximately roller 40a to approximately roller 41a. Roller 42a serves to keep the portion of tape 13 in its area clear of the tape already in contact with drum assembly 23. It should be noted that rollers 40a, 41a, and 42a, also serve to allow tape 13 to move with a minimum of resistance.

It should also be noted that, in order to draw tape 13 out of an internal elastic-belt-drive cartridge, the reels of the cartridge must be driven, in their normal fashion, all the while that the tape is being withdrawn. If the reels of the cartridge are not driven, there is too much resistance to allow the tape to be extracted without damage.

To introduce tape 13 back into cartridge 10 (i.e. tape retraction), the opposite operation to extraction occurs. Boom member 32 is pivoted back to its rest position as depicted in FIG. 4. Note that while boom member 32 is being returned to its rest position the reels of cartridge 10 must be driven in order to take up the slack in tape 13 that will occur.

Figure 7:
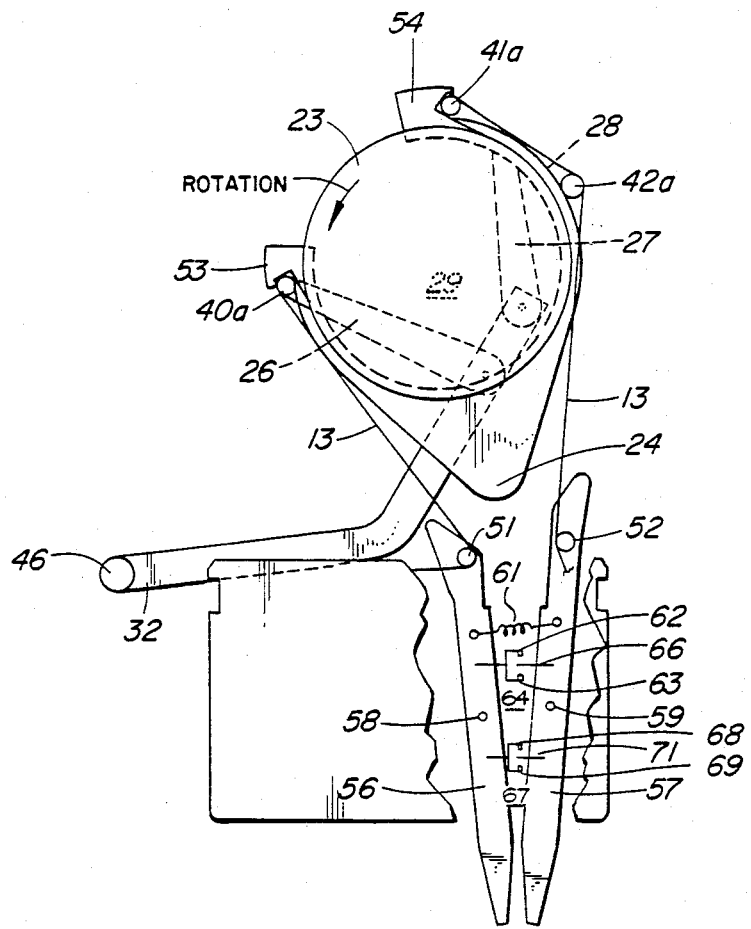
FIG. 7 is similar to FIG. 6, but additionally depicts a tension sensing mechanism.

FIG. 7 is similar to FIG. 6 except that tension arms 56 and 57, along with their associated equipment are additionally depicted. Note that rollers 51 and 52 are mounted on tension arms 56 and 57 respectively. Tension arms 56 and 57 are mounted below cartridge 10 so as to pivot about pivot pins 58 and 59 respectively. Spring 61 is used to bias together the ends of tension arms 56 and 57, carrying rollers 51 and 52.

Light source 62 (i.e. a light emitting diode, LED) and light detector 63 (e.g. a photo diode) form a light sensor 64 which, together with projection 66, provide an indication of the tension in tape 13.

As shown in FIG. 7, optical sensor 64 is mounted on tension arm 56 and projection 66 is mounted on tension arm 57. When the tension in tape 13 is below a predetermined maximum limit (e.g. 8 ounces) projection 66 protrudes (as shown in FIG. 7) between light source 62 and light detector 63. This of course prevents the light from light source 62 reaching light detector 63 and the output of optical sensor 64 is in a first state. This first state indicates that the tension in tape 13 is below the maximum limit and motor 48 (FIG. 1) is enabled to move boom member 32 toward lever guide member 24 (during the tape extraction process).

As the tension in tape 13 increases, the action of tape 13 on rollers 51 and 52 causes the two rollers to move apart. This results in lever arms 56 and 57 moving apart also such that projection 66 no longer prevents the light of light source 62 from reaching light detector 63. This results in the output of optical sensor 64 being in a second state. This second state indicates that the tension is too great and motor 48 (FIG. 2) is disabled until the tension comes within limits. Note that although motor 48 (FIG. 2) is stopped for this condition, the reels of tape cartridge 10 are still driven so as to allow the tension in the tape to decrease.

Note that the maximum tension limit is chosen such that the tension applied to the tape is greater than the normal equilibrium tape tension of the cartridge (e.g. approximately 3 ounces), but below the safe yield limit of the tape. A maximum tension limit of approximately 8 ounces has been selected to meet these criteria.

Optical sensor 67, comprised of light source 68 and light detector 69, functions to provide detection of the lower tension limit of the tape. Optical sensor 67 is mounted to tension arm 56 and a projection 71 is mounted on tension arm 57. When the tension in tape 13 is above a predetermined minimum limit (e.g. 2 ounces) projection 71 protrudes (as shown in FIG. 7) between light source 68 and light detector 69. This of course prevents the light from light source 68 reaching light detector 69 and the output of optical sensor 67 is in a first state. This first state indicates that the tension in tape 13 is above the lower limit and motor 48 (FIG. 2) is enabled to move boom member 32 toward (or away from) lever guide member 24 (during the tape extraction or retraction process).

As the tension in tape 13 decreases, the action of tape 13 on rollers 51 and 52 allows the two rollers to move together (due to the bias action of spring 61). This results in lever arms 56 and 57 moving apart, in the vicinity of optical sensor 67 and projection 71, such that projection 71 no longer prevents the light of light source 68 from reaching light detector 69. This results in the output of optical sensor 67 being in a second state. This second state indicates that the tension is too low and motor 48 (FIG. 2) is disabled (for a tape retraction process) until the tension comes within limits. Note that although motor 48 (FIG. 2) is stopped for this condition (in the tape retraction mode) the reels of tape cartridge 10 are still driven. In the tape extraction mode, if a low tape limit is encountered (i.e. the output of optical sensor 67 is in its second state) the drive motor (not shown) for the reels of the tape cartridge is inhibited and motor 48 is allowed to continue running. This allows tape tension to increase.

Note that the minimum tension limit is chosen such that the tension applied to the tape is less than the normal equilibrium tape tension of the cartridge (e.g. approximately 3 ounces), so as to enable the tape to be retracted into the cartridge during the retraction mode. The tape tension cannot be allowed to go too low or the tape will not return to the reels properly. A minimum tension limit of approximately 2 ounces has been selected to meet these criteria.

In an experimental model, the tape speed employed during the extraction process was a nominal 60 inches per second and tape was extracted from the cartridge at the ratio of approximately 1:100 (i.e. 1 inch of tape was extracted for every 100 inches of tape moved in the cartridge). The cartridge employed was a 3M model DC-300A.

What is claimed is:

1. A method of withdrawing tape from an internal belt-drive tape carrier, said method comprising the steps of:
   (a) applying a force to said tape in a direction so as to bias said tape towards the exterior of said carrier; and
   (b) driving the reels of said carrier while performing step (a).

2. The method of claim 1 wherein said force is a tensile force applied so as to pull said tape through an opening in said tape carrier.

3. A method of withdrawing tape from an internal elastic-belt-drive tape cartridge, said method comprising the steps of:
   (a) driving the reels of said cartridge in a normal manner; and
   (b) applying a tensile force to said tape in a direction so as to cause said tape to exit said cartridge.

4. The method of claim 3 wherein said force is applied to said tape at a location intermediate the two reels of said cartridge and in a direction that is approximately at right angles to the plane in which the undisturbed tape would normally lie at that location.

5. The method of claim 4 wherein the speed at which said tape is driven is approximately 60 inches per second and wherein said force applied to said tape to withdraw said tape is between approximately three ounces and eight ounces.

6. An apparatus for withdrawing tape from an internal belt-drive tape cartridge, said apparatus comprising:
   means for withdrawing tape from said cartridge by applying a tensile force to said tape; and
   means for driving the reels of said tape cartridge while said tensile force is applied to said tape.

* * * * *